US011514740B1

(12) United States Patent
Ullmann et al.

(10) Patent No.: US 11,514,740 B1
(45) Date of Patent: Nov. 29, 2022

(54) SECURING ACCESS TO RESTRICTED AREAS FROM VISITORS

(71) Applicant: INTERNATIONAL BUSINESS MACHINES CORPORATION, Armonk, NY (US)

(72) Inventors: Cristi Nesbitt Ullmann, Austin, TX (US); Brian Chow, Pflugerville, TX (US); Carole Rhoads Corley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/330,789

(22) Filed: May 26, 2021

(51) Int. Cl.
*G07C 9/25* (2020.01)
*G07C 9/28* (2020.01)
*G07C 9/00* (2020.01)
*G06V 40/16* (2022.01)

(52) U.S. Cl.
CPC ........... *G07C 9/257* (2020.01); *G06V 40/166* (2022.01); *G06V 40/172* (2022.01); *G07C 9/00904* (2013.01); *G07C 9/28* (2020.01)

(58) Field of Classification Search
CPC ...... G07C 9/257; G07C 9/00904; G07C 9/28; G06V 40/166; G06V 40/172
USPC ....................................................... 340/5.82
See application file for complete search history.

(56) References Cited

U.S. PATENT DOCUMENTS

| 8,629,895 B2 | 1/2014 | Lee | |
| 9,344,436 B1 * | 5/2016 | Sheng | H04W 12/08 |
| 9,361,442 B2 | 6/2016 | Dey | |
| 9,552,684 B2 * | 1/2017 | Bacco | H04L 9/0872 |
| 9,697,656 B2 * | 7/2017 | Trani | H04B 7/04 |
| 9,865,144 B2 * | 1/2018 | Trani | H04W 12/08 |
| 9,986,293 B2 * | 5/2018 | Hildreth | H04N 21/4755 |
| 10,032,326 B1 * | 7/2018 | Landers, Jr. | G07C 9/38 |
| 10,178,294 B2 | 1/2019 | Choo | |
| 10,235,822 B2 * | 3/2019 | Nye | G05B 15/02 |
| 10,417,403 B2 | 9/2019 | Ciano | |
| 10,803,160 B2 * | 10/2020 | Tussy | G06V 40/166 |

(Continued)

OTHER PUBLICATIONS

Mathur, "Four IBM Facial Recognition Patents in 2018, We Found Intriguing," Aug. 11, 2018, 13 pages, https://hub.packtpub.com/four-ibm-facial-recognition-patents-in-2018-we-found-intriguing/.

(Continued)

*Primary Examiner* — Nam V Nguyen
(74) *Attorney, Agent, or Firm* — David Spalding

(57) ABSTRACT

A computer-implemented method, a computer system and a computer program product secure access to a restricted area. The method includes capturing, by a camera, a first image of a face of a first person and a second image of a face of a second person. The method also includes determining whether the face of the first person is included in a database of persons authorized to access the restricted area. The method further includes determining whether the second person is in proximity to the first person. In addition, the method includes determining whether the second person is authorized to access the restricted area. Finally, the method includes transmitting a signal that the second person is authorized to access the restricted area in response to determining that the second person is in proximity to the first person and the second person is authorized to access the restricted area.

18 Claims, 6 Drawing Sheets

(56) References Cited

U.S. PATENT DOCUMENTS

| | | | |
|---|---|---|---|
| 10,850,709 B1* | 12/2020 | Nagata | G07C 9/00563 |
| 11,080,955 B2* | 8/2021 | Russo | H04L 63/0861 |
| 11,200,767 B2* | 12/2021 | Boyes | G07C 9/37 |
| 2007/0189585 A1* | 8/2007 | Sukegawa | G07C 9/37 |
| | | | 382/118 |
| 2007/0242860 A1* | 10/2007 | Hasebe | G06V 40/166 |
| | | | 382/118 |
| 2013/0282446 A1 | 10/2013 | Dobell | |
| 2014/0266669 A1 | 9/2014 | Fadell | |
| 2016/0371625 A1 | 12/2016 | Mosley | |

OTHER PUBLICATIONS

Mell et al., "The NIST Definition of Cloud Computing", National Institute of Standards and Technology, Special Publication 800-145, Sep. 2011, 7 pages.

Thales Group, "Facial Recognition: Top 7 Trends (tech, vendors, markets, use cases & latest news)," Feb. 20, 2021, 31 pages, https://www.gemalto.com/govt/biometrics/facial-recognition.

* cited by examiner

SECURING ACCESS TO RESTRICTED AREAS FROM VISITORS

FIELD

Embodiments relate generally to securing access to restricted areas through the authentication of visitors attempting to enter or exit and, in particular, to the use of facial recognition algorithms with captured images and detection of connections between people in physical proximity to determine if they may be admitted to a restricted area.

BACKGROUND

Restricted areas such as intensive care and/or memory care units in hospitals or secure facilities such as data centers and even most office buildings, among other things, use increasingly sophisticated security systems to limit who may enter their facilities. In addition, through the rapid increase of social media use and browsing the Internet in general, there is a wealth of publicly available information about most people, including their personal and professional connections to other people, among other things, that can be acquired and analyzed.

SUMMARY

An embodiment is directed to a computer-implemented method for securing access to a restricted area. The method may include capturing, by a camera, a first image of a face of a first person and a second image of a face of a second person. The method may also include determining whether the second person is in proximity to the first person. The method may further include determining whether the second person is authorized to access the restricted area. Finally, the method may include transmitting a signal that the second person is authorized to access the restricted area in response to determining that the second person is in proximity to the first person and the second person is authorized to access the restricted area.

In an embodiment, the determining whether the second person is in proximity to the first person may include determining that the second image of a face of the second person is captured within a preconfigured amount of time of capturing the first image of the face of the first person.

In an embodiment, the determining whether the second person is in proximity to the first person may include determining whether the second person is within a preconfigured distance of the first person.

In a further embodiment, the determining whether the second person is authorized to access the restricted area may include determining that the face of the second person is included in a database of persons authorized to access the restricted area.

In another embodiment, the determining whether the second person is authorized to access the restricted area may include determining that the face of the first person is included in a database of persons authorized to access the restricted area, acquiring a web browsing and social media history of the first person and the second person, and detecting a connection between the first person and the second person based on the acquired web browsing and social media history of the first and second persons.

In a further embodiment, the determining whether the second person is authorized to access the restricted area may include determining that the face of the first person is included in a database of persons authorized to access the restricted area, and determining from a history of prior access to the restricted area that the first person and the second person have jointly accessed the restricted area.

In yet another embodiment, the method may include storing the determination of whether the second person is authorized to access the restricted area in an authorization database and using a machine learning model to update the authorization database.

In another embodiment, the method may include, if the second person is determined to not be in proximity to the first person, capturing, by a camera, a third image of a face of a third person, determining whether the third person is in proximity to the first person, determining whether the third person is authorized to access the restricted area, and transmitting a signal to a control device admitting the third person to the restricted area in response to determining that the third person is in proximity to the first person and the third person is authorized to access the restricted area.

In addition to a computer-implemented method, additional embodiments are directed to a system and a computer program product for securing access to a restricted area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
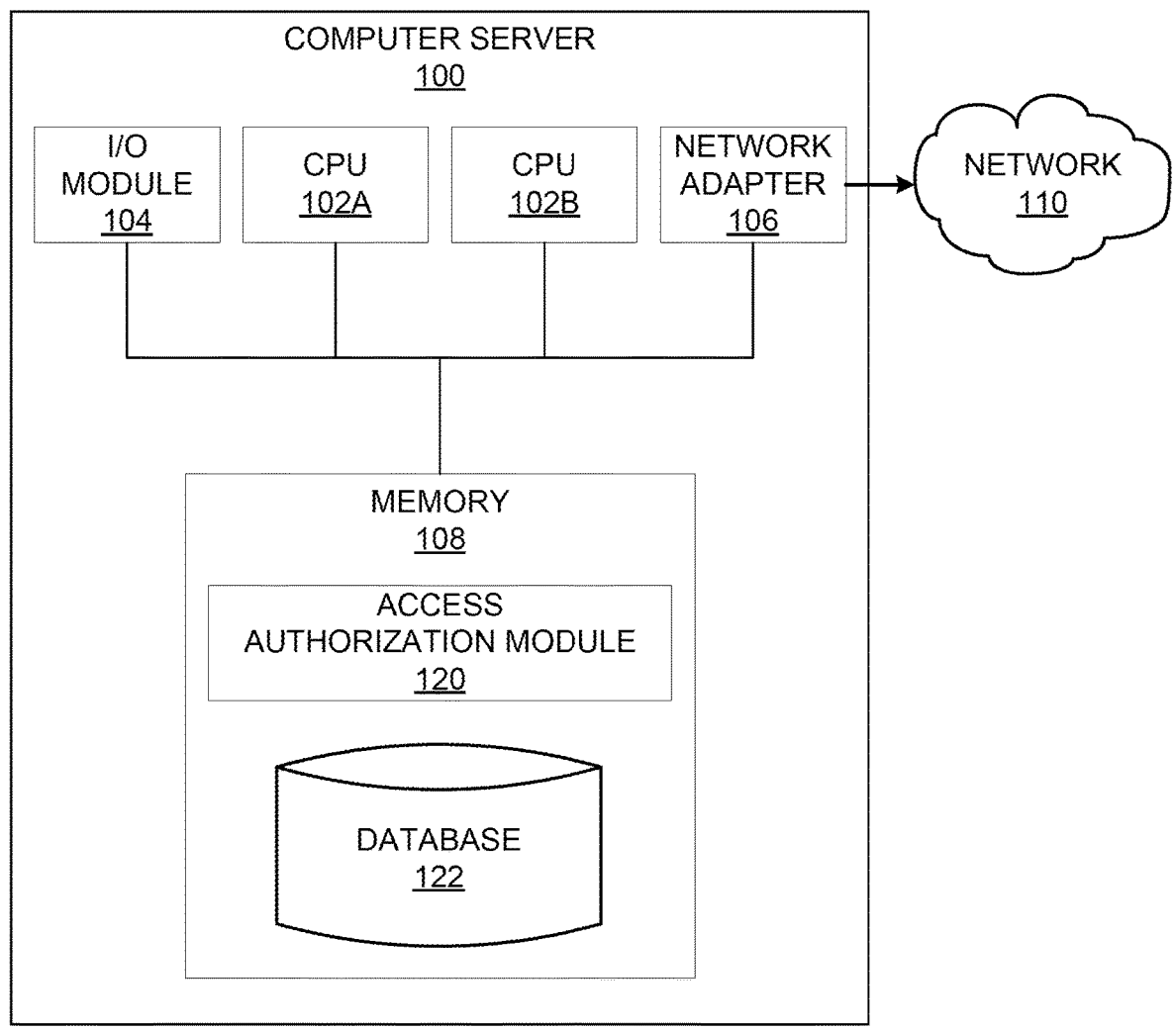
FIG. 1 depicts a block diagram of an example computer server within a security system in which various embodiments may be implemented.

It is increasingly important to maintain security in a number of environments, from preventing unauthorized access to one's home or vehicle or other personal property to commercial office buildings, e.g, limiting access to employees only, or other restricted areas such as in a hospital where it may be critical to limit a patient's visitors to specific people or a data center where only people authorized to handle the data may access the equipment. Most schemes for limiting access to restricted areas rely on techniques such as a physical badge that one has to wear or signing into a log that requires each person to be identified individually and separately cleared for entry to the restricted area. However, there is frequently a need to tie two or more people together for security purposes. For example, it may be important in the data center environment to admit visitors for reasons such as maintenance or perhaps executive visits or tours. Most of these scenarios require an authorized person such as an employee of the data center to accompany the visitor into the restricted areas, regardless of whether that visitor has been separately cleared for access.

To solve this problem, embodiments of the present invention may use devices such as fixed cameras in an entryway or cameras on mobile devices in the immediate area to capture images of people attempting to enter a restricted area. Facial recognition algorithms may then be used to identify an authorized person entering and also any people within physical proximity from the authorized person. As used herein, physical proximity may be preconfigured within the system as a distance between two people such as six to ten feet or as a time between the capture of an image of each person, e.g., the subjects of any images captured within 7 seconds of one another are considered to be physically proximate. This measurement may be done in any appropriate manner to aid in determining if two people are accompanying each other at the entry or exit point where the images are being captured.

Once captured and analyzed, these images may be used to determine a connection between the people in the images, such as social media connections or perhaps a past history of entering the restricted area to determine if a second person should be allowed to enter or exit with the authorized person. It should be noted that facial recognition as used herein requires the informed consent of all people whose images are captured for analysis. Consent may be obtained in real time or through a prior waiver or other process that informs a subject that their image will be captured by a camera and that the image will be analyzed by a facial recognition algorithm.

In an embodiment, the determination of a personal connection between the people in the captured images that are proximate to one another may be enhanced using a machine learning model in conjunction with social media and access logs. For instance, a technician who frequently services equipment in a data center may accompany a specific employee or group of employees each time. This activity may be captured in a machine learning model to remember existing connections or relationships by storing them in an authorization database and refine the process of determining a personal connection or relationship between people accessing a restricted area by referring to the authorization database before beginning a new determination of personal connections or relationships.

Referring to FIG. 1, a block diagram of a computer server 100, in which processes involved in the embodiments described herein may be implemented, is shown. Computer server 100 represents computer hardware that runs the software described in the embodiments and may also be controlling a security system, which is shown below in FIG. 2. Computer server 100 may include one or more processors (CPUs) 102A-B, input/output circuitry 104, network adapter 106 and memory 108. CPUs 102A-B execute program instructions in order to carry out the functions of the present communications systems and methods. FIG. 1 illustrates an embodiment in which computer server 100 is implemented as a single multi-processor computer system, in which multiple processors 102A-B share system resources, such as memory 108, input/output circuitry 104, and network adapter 106. However, the present communications systems and methods also include embodiments in which computer server 100 is implemented as a plurality of networked computer systems, which may be single-processor computer systems, multi-processor computer systems, or a mix thereof. Input/output circuitry 104 provides the capability to input data to, or output data from, computer server 100.

Network adapter 106 interfaces computer server 100 with a network 110, which may be any public or proprietary LAN or WAN, including, but not limited to the Internet.

Memory 108 stores program instructions that are executed by, and data that are used and processed by, CPU 102A-B to perform the functions of computer server 100. Memory 108 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an Integrated Drive Electronics (IDE) interface, or a variation or enhancement thereof, such as enhanced IDE (EIDE) or Ultra-Direct Memory Access (UDMA), or a Small Computer System Interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a Fibre Channel-Arbitrated Loop (FC-AL) interface.

The contents of memory 108 may vary depending upon the function that computer server 100 is programmed to perform. In the example shown in FIG. 1, example memory contents are shown representing routines and data for embodiments of the processes described herein. However, it may be recognized that these routines, along with the memory contents related to those routines, may not be included on one system or device, but rather may be distributed among a plurality of systems or devices, based on well-known engineering considerations. The present communications systems and methods may include any and all such arrangements.

Included within memory 108 is the access authorization module 120 which may run the routines that are described in the embodiments below. In order to access logs of previous attempts to access restricted areas and also to determine if a person is authorized to access a restricted area, the access authorization module 120 may access a database 122 that contains the list of authorized persons. Also, as the access authorization module 120 interacts with new visitors and determines connections between people, it may update the database 122 to include the information that it determines is relevant. The database 122 may be in any form that holds necessary information about the people that are authorized to enter or exit the restricted area, including facial images for comparing to the images that may be captured and identified as part of the process for securing access to the restricted area.

Figure 2:
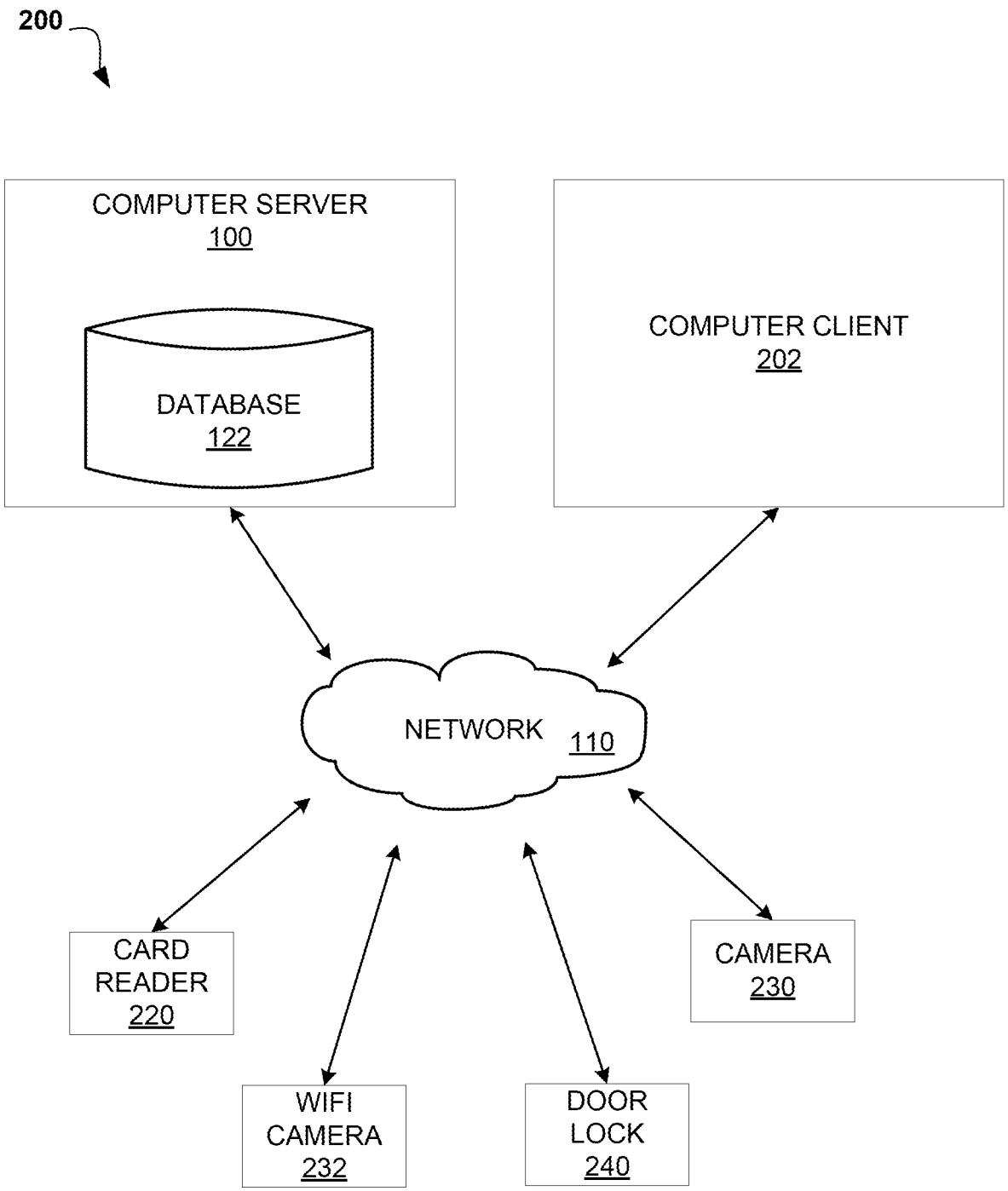
FIG. 2 depicts an example security system for a restricted area according to an embodiment.

Referring to FIG. 2, an example security system 200 for a restricted area is shown which may include several components in addition to computer server 100. As shown in FIG. 2, these components may include cameras, both wired cameras 230 and wireless (or WiFi) cameras 232, along with devices to physically secure the restricted area such as card readers 220 connected to doors for receiving badge information from people attempting to enter the restricted area, as well as physical door locks 240 that may be released if a person is authorized to enter the restricted area. There may also be additional computing devices and hosts that are distributed throughout a building or campus, for instance terminals with an operator such as a security guard or mobile devices issued to security personnel that may display facial images as well as alerts that indicate if a person is authorized to access the restricted area or not. There may be further devices included within the security system 200 and connected via the network 110 that are not shown.

In the depicted configuration, cameras may be placed throughout a building in anticipation of detecting visitors to restricted areas and the need to capture images for later facial recognition. A camera may include a wired 230 and/or wireless camera 232 (e.g., an IP camera, a WiFi camera) which may be used to record visual images in the form of photographs, film, and/or video signals, among other things. The camera may be connected to the security system 200 through a wired and/or wireless connection, and may also be a component of an Internet of Things (IoT) network which may include embedded sensors, software, and/or technology capable of connecting to and exchanging data with systems and/or devices over the Internet.

Figure 3:
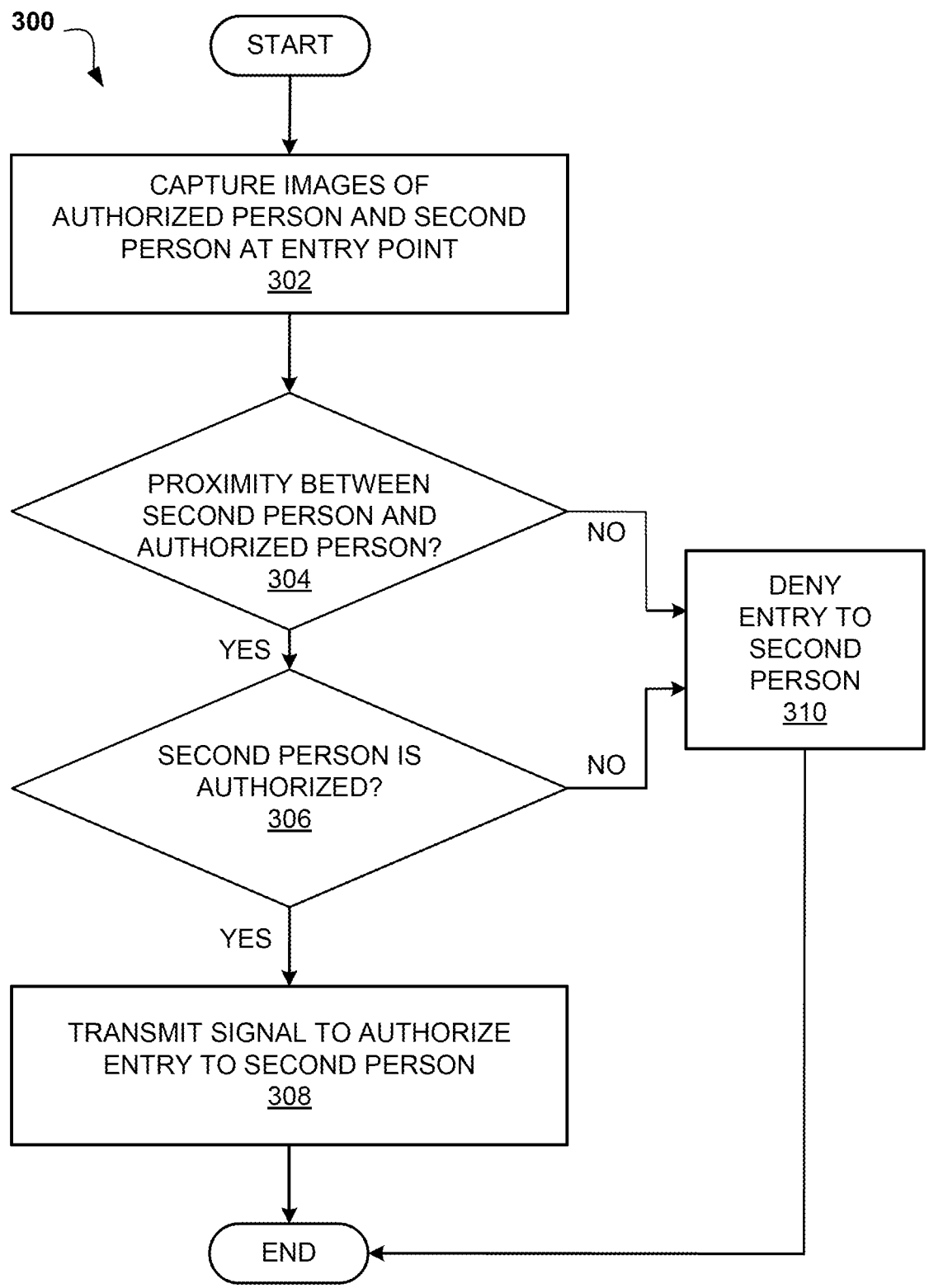
FIG. 3 depicts a flow chart diagram of a process to secure access to restricted areas from visitors in accordance with one or more embodiments.

Referring to FIG. 3, an operational flowchart illustrating a process 300 for securing access to a restricted area from visitors is depicted according to at least one embodiment. At 302, a camera may be used to acquire facial images of an authorized person and other people determined to be in physical proximity to the authorized person at a location such as an entry or exit point to or from a restricted area. The facial images may be used to determine whether an unauthorized person is attempting to accompany an authorized person.

In some embodiments, two or more cameras may be employed, e.g., a first camera positioned at a first angle to capture the faces from the front and a second camera separate from the first positioned to capture an angle from the side and to capture any people that cannot be seen in the first image. The two or more cameras may capture views from different distances to further capture any image that may assist with seeing additional people or determining whether the second person is accompanying the authorized person. For example, one camera may capture the authorized person's face but a second person is directly behind the authorized person and is not visible. The second camera may capture the face of the second person from the side or perhaps a camera from a longer distance may capture the face of the second person or pick up an image of a third person that may also be in physical proximity to the authorized person. Images captured by the one or more cameras may be used to analyze a facial expression or an eye movement in the one or more images of the authorized person and any other person in order to determine whether the people that are captured in the image(s) are in physical proximity and are accompanying one another.

At 304, it may be determined whether an authorized person and any other people are in physical proximity to each other. To accomplish this, facial recognition algorithms may be used on the images captured at 302 to specifically identify the faces in the captured images. The facial recognition algorithm in use may include principal component analysis (PCA), Independent Component Analysis (ICA), Linear Discriminant Analysis (LDA), an Active Appearance Model (AAM), a Support Vector Machine (SVM) and/or video-based face recognition algorithms. This is a non-exhaustive list of facial recognition algorithms meant to provide examples of techniques that may be used to identify faces from the captured images. Also, as mentioned above, any use of the facial recognition algorithms noted in this description requires the informed consent of the person whose image is captured, whether the person is authorized to enter or not.

Once a face is specifically identified from an image, that face may be compared to a database of authorized people that is kept in the security system. Only once a person in an image has been identified as an authorized person may further analysis be conducted to determine if another person is in physical proximity to the authorized person. To determine physical proximity, a time window may be used between the entry or exit of the authorized person and another person(s) to be analyzed. For example, if the authorized person passed an entry or exit point of a restricted area, it may be assumed that any other person passing the entry or exit point within 7 seconds of the authorized person should be considered physically proximate to the authorized person and analyzed for their connection, if any, to the authorized person. In the same example, if the second person passed the entry or exit point more than 10 seconds after the authorized person, an alarm may sound (assuming they are not an authorized person themselves). The time window may be preconfigured at the time of system setup and may also be adjusted over time to match specific conditions that are encountered in the field. For example, one physical configuration may require that people line up and enter in single file, in which case the time between captured images may be shorter or longer than the time that would be measured in a situation where people walk together, e.g., side by side, and images are captured of each member in the group.

In a further embodiment, one person may be determined to be physically proximate to the authorized person while another person is not. Another example of this embodiment may be that people already in the database 122, who would be independently admitted to the restricted area, and people that require further analysis because they are unknown to the security system are both in proximity. In such a situation, images of all people at the entry or exit point may be captured and should they already be in the database 122 or determined to be not physically proximate to the authorized person, no further analysis would be done. However, the determination of proximity or authorization is done independently of analysis of other people so analysis would continue on any remaining person to determine physical proximity or whether they are authorized to access the restricted area.

At this stage of the process, it is only necessary to determine physical proximity between the people in the captured images as only those people in physical proximity to an authorized person are examined for a prior connection that may cause them to be granted access to the restricted area. It will be appreciated by one of ordinary skill in the art that there are multiple ways to determine proximity between people using captured facial images. If the second person and authorized person are determined to be physically proximate to one another, e.g., the images are taken between 7 and 10 seconds as described in the prior example or two faces in a single image are within 6 feet of each other, analysis may be done to determine whether the second person is authorized to access the restricted area at 306. Otherwise, entry or exit may be denied at 310, described below.

At 306, it may be determined whether the second person is authorized to enter the restricted area. To accomplish this, the people in close physical proximity may be specifically identified using a facial recognition algorithm with their captured image and then examined for a connection to the authorized person that may cause a second person in proximity to be granted access to the restricted area. It may be understood that a person in close physical proximity who is already in the database 122 as an authorized person may be granted access to the restricted area without further examination.

In one embodiment, the second person may be identified as having a connection to the authorized person but then also would have to be specifically identified in the database 122 as an authorized person in order to be granted access to the restricted area, e.g., an explicit permission for the second person is recorded in the database. In this embodiment, the security system may only grant access to people with prior authorization so the connection between the authorized person and the person in proximity may be important, but an explicit permission for the second person must be in the database 122 for access to the restricted area to be granted.

In another embodiment, only the authorized person would be specifically identified, and any second person identified as having a connection to the authorized person would be granted access to the restricted area. In this embodiment, the restricted area may have a profile in the database 122 that anyone is granted access to the restricted area as long as they have an escort who is authorized. For instance, a business associate or other person who is not an employee may be allowed into certain meeting rooms in an office building whenever a current employee is also present.

It should be noted that embodiments of the present invention do not only apply to entry to restricted areas but may also apply to exit from restricted areas as well. For example, two people may exit a memory care center such that a friend or relative, whose face may not be in the security database as staff of the memory care center but may become an authorized person through an analysis of their relationship to the patient or from a log of prior visits, could take a patient, who may be well-known in the security database of the memory care center, out to lunch or an outing of another sort.

In many cases, a connection such as a prior working relationship or familiarity on a personal or professional level to an authorized person may be needed to determine whether a person in proximity to an authorized person may be granted access to the restricted area. As an example of finding a connection between an authorized person and a second person, web browsing, social media and electronic communications history for the authorized and second persons may be collected and searched or analyzed for any common activities. For instance, the authorized and second persons may be listed as friends or business colleagues on various websites. In another example, the second person may be referenced in several posts on Internet websites that are made by the authorized person. In a further example, the second and authorized persons may have one or more conversations with each other in their history on social media websites. In another example, the authorized person and second person may work in the same department presently or in the past and a professional connection may be discovered in a posted resume or else in a professional social media profile. In yet another example, the second person and the authorized person may have had one or more electronic communications with each other, e.g., via email or a chat application, and records of the communications are included in respective history files of electronic communications for the second person and the authorized person.

In another embodiment, the access log to the restricted area may be accessed to determine if the second person has accompanied the authorized person into this or any other restricted area in the past. Accessing the log may also find that the second person has accompanied another authorized person in the past and may require further analysis to determine a connection between the current authorized person and the prior authorized person to determine if they may be authorized to enter or exit the restricted area.

In an embodiment, machine learning may be incorporated to improve the determination of a personal connection between the people in the captured images that are proximate to one another as the process gains experience. This experience may lead to both improving confidence of the connection or relationship and reducing the time it takes to authorize the second person to access the restricted area. As discussed in more detail in FIG. 4, the machine learning model may work in conjunction with social media and access logs and remember prior connections between people approaching a restricted area by storing the connection or relationship in an authorization database. For instance, a technician who frequently services equipment in a data center may accompany a specific employee or group of employees each time. Once this activity is learned by the model and stored in the database, it may be used to train the model and refine the process of determining a personal connection or relationship between people accessing a restricted area by referring to the authorization database first.

One of ordinary skill in the art may recognize that there are multiple ways to determine a connection between the authorized person and a second person that may allow the second person to be authorized to enter or exit a restricted area when accompanying an authorized person. If the second person is not authorized to access the restricted area, entry or exit may be denied at 310, described below.

At 308, if a second person is determined to be in proximity to an authorized person and is authorized to access the restricted area, a signal may be transmitted to grant access to the restricted area. In an embodiment, this may entail releasing a door lock 240 or displaying an indication on a screen connected to a computer client 202 that may be a computer terminal or a mobile device issued to security personnel that access has been granted or both. In an embodiment, a security officer may be nearby, manually granting access to the second person in response to signals received from the security system 200.

Similarly, at 310, if a second person is not determined to be in proximity to an authorized person or is not authorized to access the restricted area, they may be denied entry to the restricted area. In an embodiment, this may entail displaying an indication on a screen connected to a computer client 202 that may be a computer terminal or a mobile device issued to security personnel that access has been denied. In an embodiment, a security officer may be nearby, manually denying access in response to signals received from the security system 200 or possibly deny access to the restricted area and inform the appropriate authorities if necessary.

Figure 4:
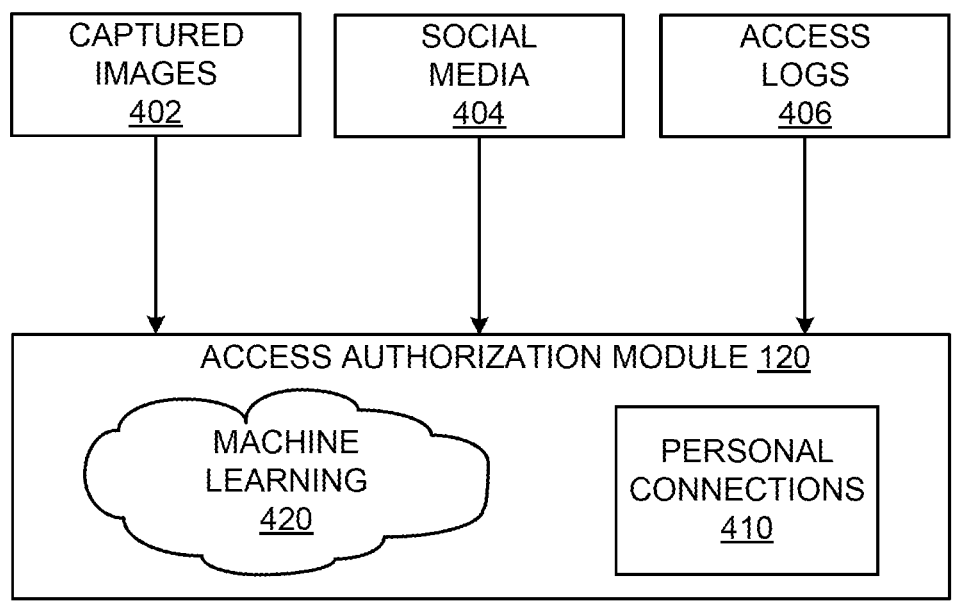
FIG. 4 depicts a block diagram of the inputs and machine learning model of a process to refine and update the personal connections found between people accessing a restricted area according to an embodiment.

Referring now to FIG. 4, a diagram showing examples of components or modules of a process to refine and update the determination of personal connections or relationships between people accessing a restricted area is depicted according to at least one embodiment. According to one embodiment, the process may include access authorization module 120 which utilizes supervised machine learning 420 to determine a personal connection 410 based on social media and prior access history between two people in captured images who are accessing a restricted area. The supervised machine learning model may use an appropriate machine learning algorithm, e.g., Support Vector Machines (SVM) or random forests. The access authorization module 120 may monitor the captured images 402 that are obtained and access social media profiles and interactions 404, as well as access logs 406 for this and other restricted areas as mentioned above with respect to FIG. 3. One of ordinary skill in the art will recognize that there are many ways for the module to collect information about people accessing a restricted area. The access authorization module 120 may use the above information to determine personal connections 410 for an implementation and also may store and update an authorization database to remember personal connections 410 that it finds in the process.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
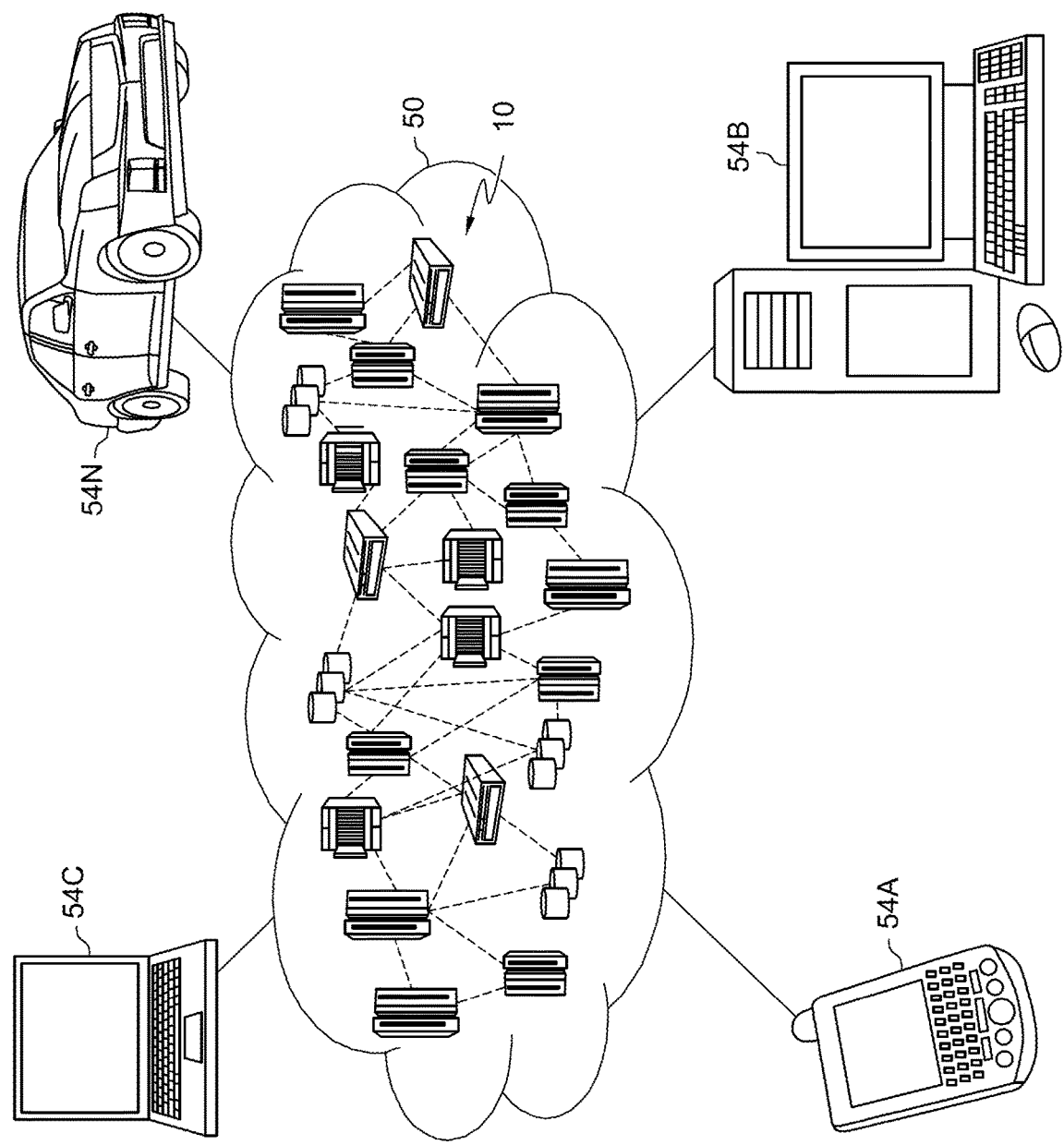
FIG. 5 depicts a cloud computing environment according to an embodiment.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
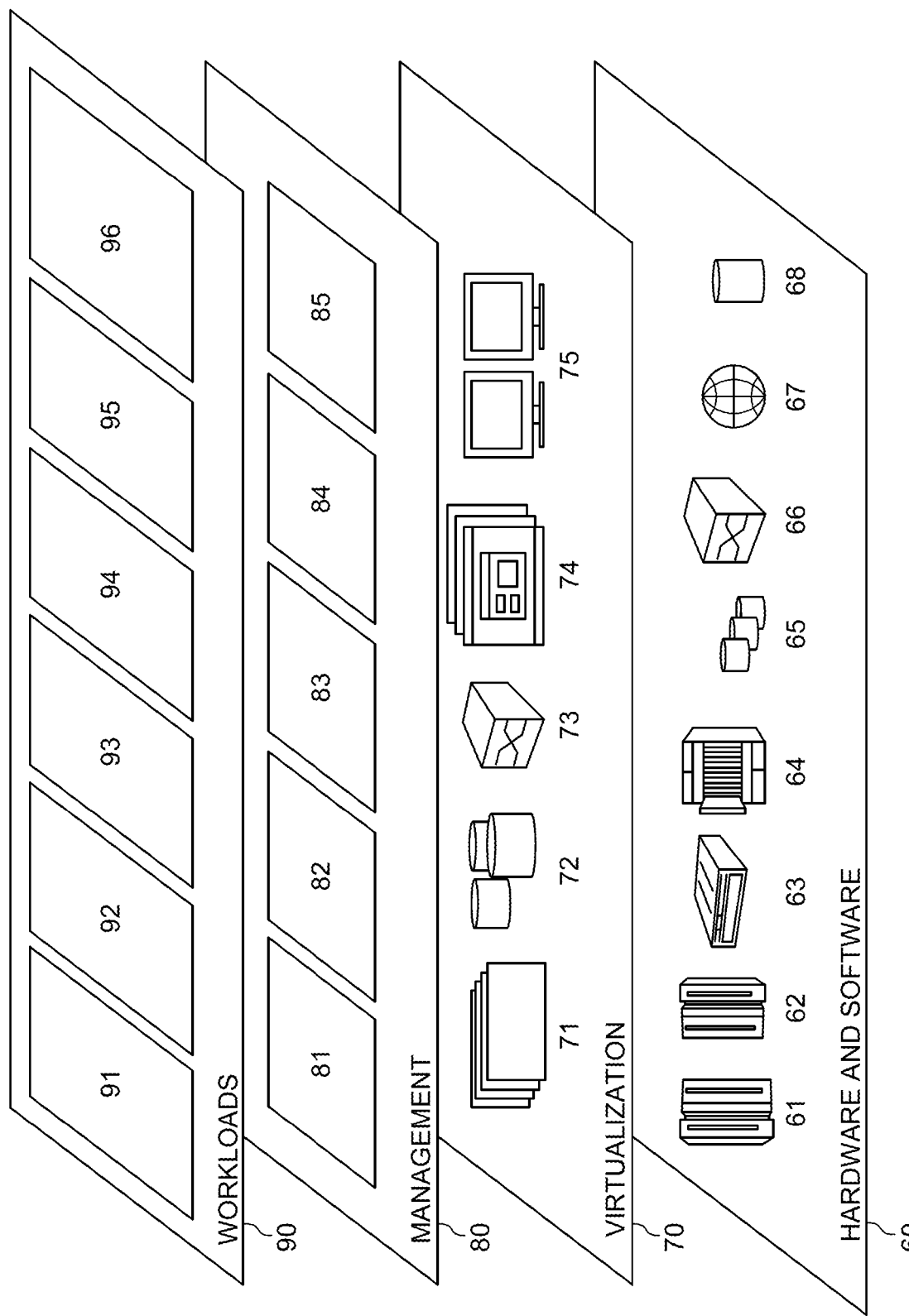
FIG. 6 depicts abstraction model layers according to an embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and other applications 96 such as the access authorization module 120.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for securing access to a restricted area, the method comprising:
    capturing, by a camera, a first image of a face of a first person and a second image of a face of a second person;
    determining that the first person is authorized to access the restricted area based on the face of the first person being included in a database of authorized people;
    determining that the second person is within a preconfigured distance of the first person by capturing the second image of a face of the second person at a common location within a preconfigured amount of time after capturing the first image of the face of the first person;
    determining that a connection exists between the first person and the second person, wherein an existence of the connection indicates that the second person is authorized to access the restricted area; and
    granting restricted area access to the second person.

2. The computer-implemented method of claim 1, further comprising:
    granting the restricted area access to the second person when the face of the second person is included in the database of authorized people.

3. The computer-implemented method of claim 1, wherein the determining that the connection exists between the first person and the second person comprises:
    acquiring a web browsing history and a social media history of the first person and the second person; and
    determining that the connection exists between the first person and the second person when a relationship is detected between the first person and the second person in the acquired web browsing history and the acquired social media history.

4. The computer-implemented method of claim 1, wherein the determining that the connection exists between the first person and the second person comprises:
    acquiring a history of prior access to all restricted areas within a security system; and
    determining that the connection exists between the first person and the second person when it is detected in the acquired history of prior access to all restricted areas within the security system that the first person and the second person have jointly accessed any restricted area within the security system.

5. The computer-implemented method of claim 1, further comprising:
    storing the determination that the second person is authorized to access the restricted area in an authorization database; and
    using a machine learning model to update the authorization database.

6. The computer-implemented method of claim 1, wherein the second person is determined to not be within the preconfigured distance of the first person, further comprising:
    capturing, by the camera, a third image of a face of a third person;
    determining that the third person is within the preconfigured distance of the first person by capturing the third image of a face of the third person at the common location within the preconfigured amount of time after capturing the first image of the face of the first person;
    determining that the connection exists between the first person and the third person, wherein the existence of the connection indicates the third person is authorized to access the restricted area; and
    granting the restricted area access to the third person.

7. A computer system for securing access to a restricted area, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
    capturing, by a camera, a first image of a face of a first person and a second image of a face of a second person;
    determining that the first person is authorized to access the restricted area based on the face of the first person being included in a database of authorized people;
    determining that the second person is within a preconfigured distance of the first person by capturing the second image of a face of the second person at a common location within a preconfigured amount of time after capturing the first image of the face of the first person;

determining that a connection exists between the first person and the second person, wherein an existence of the connection indicates that the second person is authorized to access the restricted area; and granting restricted area access to the second person.

8. The computer system of claim 7, further comprising:
granting the restricted area access to the second person when the face of the second person is included in the database of authorized people.

9. The computer system of claim 7, wherein the determining that the connection exists between the first person and the second person comprises:
acquiring a web browsing history and a social media history of the first person and the second person; and
determining that the connection exists between the first person and the second person when a relationship is detected between the first person and the second person in the acquired web browsing history and the acquired social media history.

10. The computer system of claim 7, wherein the determining that the connection exists between the first person and the second person comprises:
acquiring a history of prior access to all restricted areas within a security system; and
determining that the connection exists between the first person and the second person when it is detected in the acquired history of prior access to all restricted areas within the security system that the first person and the second person have jointly accessed any restricted area within the security system.

11. The computer system of claim 7, further comprising:
storing the determination that the second person is authorized to access the restricted area in an authorization database; and
using a machine learning model to update the authorization database.

12. The computer system of claim 7, wherein the second person is determined to not be within the preconfigured distance of the first person, further comprising:
capturing, by the camera, a third image of a face of a third person;
determining that the third person is within the preconfigured distance of the first person by capturing the third image of a face of the third person at the common location within the preconfigured amount of time after capturing the first image of the face of the first person;
determining that the connection exists between the first person and the third person, wherein the existence of the connection indicates the third person is authorized to access the restricted area; and
granting the restricted area access to the third person.

13. A computer program product for securing access to a restricted area, the computer program product comprising:
a computer-readable storage device storing computer-readable program code embodied therewith, the computer-readable program code comprising program code executable by a computer to perform a method comprising:
capturing, by a camera, a first image of a face of a first person and a second image of a face of a second person;
determining that the first person is authorized to access the restricted area based on the face of the first person being included in a database of authorized people;
determining that the second person is within a preconfigured distance of the first person by capturing the second image of a face of the second person at a common location within a preconfigured amount of time after capturing the first image of the face of the first person;
determining that a connection exists between the first person and the second person, wherein an existence of the connection indicates that the second person is authorized to access the restricted area; and
granting restricted area access to the second person.

14. The computer program product of claim 13, further comprising:
granting the restricted area access to the second person when the face of the second person is included in the database of authorized people.

15. The computer program product of claim 13, wherein the determining that the connection exists between the first person and the second person comprises:
acquiring a web browsing history and a social media history of the first person and the second person; and
determining that the connection exists between the first person and the second person when a relationship is detected between the first person and the second person in the acquired web browsing history and the acquired social media history.

16. The computer program product of claim 13, wherein the determining that the connection exists between the first person and the second person comprises:
acquiring a history of prior access to all restricted areas within a security system; and
determining that the connection exists between the first person and the second person when it is detected in the acquired history of prior access to all restricted areas within the security system that the first person and the second person have jointly accessed any restricted area within the security system.

17. The computer program product of claim 13, further comprising:
storing the determination that the second person is authorized to access the restricted area in an authorization database; and
using a machine learning model to update the authorization database.

18. The computer program product of claim 13, wherein the second person is determined to not be within the preconfigured distance of the first person, further comprising:
capturing, by the camera, a third image of a face of a third person;
determining that the third person is within the preconfigured distance of the first person by capturing the third image of a face of the third person at the common location within the preconfigured amount of time after capturing the first image of the face of the first person;
determining that the connection exists between the first person and the third person, wherein the existence of the connection indicates the third person is authorized to access the restricted area; and
granting the restricted area access to the third person.

* * * * *